(12) United States Patent
Friedmann et al.

(10) Patent No.: US 10,592,414 B2
(45) Date of Patent: Mar. 17, 2020

(54) FILTERING OF REDUNDANTLY SCHEDULED WRITE PASSES

(71) Applicant: INTERNATIONAL BUSINESS MACHINES CORPORATION, Armonk, NY (US)

(72) Inventors: Simon H. Friedmann, Boeblingen (DE); Girish G. Kurup, Bangalore (IN); Markus Kaltenbach, Holzgerlingen (DE); Ulrich Mayer, Schoenbuch (DE); Martin Recktenwald, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 15/650,010

(22) Filed: Jul. 14, 2017

(65) Prior Publication Data
US 2019/0018779 A1    Jan. 17, 2019

(51) Int. Cl.
*G06F 12/0855*    (2016.01)
*G06F 12/0831*    (2016.01)
(Continued)

(52) U.S. Cl.
CPC ........ *G06F 12/0857* (2013.01); *G06F 12/084* (2013.01); *G06F 12/0817* (2013.01);
(Continued)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883;
(Continued)

(56) References Cited

U.S. PATENT DOCUMENTS 3,840,862 A * 10/1974 Ready ................. G06F 12/0864
711/128
3,840,863 A * 10/1974 Fuqua ................. G06F 12/0864
711/172
(Continued)

OTHER PUBLICATIONS

Programmable Caches with a Data Management Language and Policy Engine; Sevilla et al.; 18th IEEE/ACM International Symposium on Cluster, Cloud and Grid Computing; May 1-4, 2018 (Year: 2018).*
(Continued)

*Primary Examiner* — Daniel C. Chappell
(74) *Attorney, Agent, or Firm* — Alexis N. Hatzis

(57) ABSTRACT

Improving access to a cache by a processing unit. One or more previous requests to access data from a cache are stored. A current request to access data from the cache is retrieved. A determination is made whether the current request is seeking the same data from the cache as at least one of the one or more previous requests. A further determination is made whether the at least one of the one or more previous requests seeking the same data was successful in arbitrating access to a processing unit when seeking access. A next cache write access is suppressed if the at least one of previous requests seeking the same data was successful in arbitrating access to the processing unit.

18 Claims, 12 Drawing Sheets

(51) Int. Cl.
*G06F 12/0817* (2016.01)
*G06F 12/084* (2016.01)
*G06F 12/0888* (2016.01)
*G06F 12/0897* (2016.01)
*G06F 12/0811* (2016.01)
*G06F 12/0842* (2016.01)
*G06F 12/1027* (2016.01)

(52) U.S. Cl.
CPC ...... *G06F 12/0831* (2013.01); *G06F 12/0888* (2013.01); *G06F 12/0897* (2013.01); *G06F 12/0811* (2013.01); *G06F 12/0842* (2013.01); *G06F 12/1027* (2013.01); *G06F 2212/1016* (2013.01); *G06F 2212/60* (2013.01); *G06F 2212/62* (2013.01); *G06F 2212/621* (2013.01); *G06F 2212/655* (2013.01)

(58) Field of Classification Search
CPC ............. G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 4,349,871 A * | 9/1982 | Lary | G06F 12/084 | 711/138 |
| 4,400,770 A * | 8/1983 | Chan | G06F 12/0802 | 711/210 |
| 4,879,666 A * | 11/1989 | Kembo | G06K 15/02 | 345/551 |
| 5,029,072 A * | 7/1991 | Moyer | G06F 12/1027 | 711/145 |
| 5,367,656 A * | 11/1994 | Ryan | G06F 12/0862 | 711/213 |
| 5,371,870 A * | 12/1994 | Goodwin | G06F 12/0862 | 710/52 |
| 5,615,402 A * | 3/1997 | Quattromani | G06F 9/30043 | 708/104 |
| 5,694,571 A * | 12/1997 | Fuller | G06F 3/0601 | 711/113 |
| 5,754,820 A | 5/1998 | Yamagami | | |
| 5,781,733 A * | 7/1998 | Stiles | G06F 12/0804 | 709/203 |
| 5,890,219 A * | 3/1999 | Scaringella | G06F 3/0619 | 707/999.202 |
| 5,920,892 A * | 7/1999 | Nguyen | G06F 13/4027 | 709/216 |
| 6,105,108 A * | 8/2000 | Steely, Jr. | G06F 12/0811 | 711/118 |
| 6,338,118 B2 * | 1/2002 | Johnson | G06F 12/0864 | 711/128 |
| 7,386,685 B2 * | 6/2008 | Blumrich | G06F 12/0822 | 711/146 |
| 7,434,000 B1 * | 10/2008 | Barreh | G06F 12/0859 | 711/118 |
| 7,900,024 B2 | 3/2011 | Abernathy et al. | | |
| 8,195,881 B2 | 6/2012 | Bohn et al. | | |
| 9,519,549 B2 * | 12/2016 | Blount | G06F 11/1456 | |
| 2001/0011330 A1 | 8/2001 | Hughes | | |
| 2003/0004952 A1 | 1/2003 | Nixon et al. | | |
| 2003/0191885 A1 * | 10/2003 | Thimmanagari | G06F 12/0802 | 711/3 |
| 2004/0024968 A1 * | 2/2004 | Lesartre | G06F 1/3225 | 711/128 |
| 2004/0054806 A1 * | 3/2004 | Basu | H04L 45/00 | 709/242 |
| 2005/0114592 A1 * | 5/2005 | Jin | G06F 3/0611 | 711/113 |
| 2006/0044603 A1 * | 3/2006 | Meeker | G06F 3/1215 | 358/1.15 |
| 2006/0059311 A1 | 3/2006 | Van De Waerdt | | |
| 2006/0224839 A1 * | 10/2006 | Blumrich | G06F 12/0822 | 711/146 |
| 2006/0285397 A1 * | 12/2006 | Nishihara | G06F 3/061 | 365/185.33 |
| 2010/0274772 A1 | 10/2010 | Samuels | | |
| 2011/0271057 A1 * | 11/2011 | Karlsson | G06F 12/0855 | 711/122 |
| 2011/0289263 A1 | 11/2011 | McWilliams et al. | | |
| 2013/0198459 A1 * | 8/2013 | Joshi | G06F 12/084 | 711/130 |
| 2014/0143471 A1 | 5/2014 | Moyer et al. | | |
| 2016/0026409 A1 * | 1/2016 | Tanaka | G06F 12/0866 | 711/120 |
| 2016/0070651 A1 | 3/2016 | Shwartsman et al. | | |
| 2018/0341495 A1 * | 11/2018 | Culurciello | G06F 9/3895 | |

OTHER PUBLICATIONS

IBM, List of IBM Patents or Patent Applications Treated as Related, Appendix P, dated Nov. 8, 2017, 2 pages.

Pending U.S. Appl. No. 15/805,549, filed Nov. 7, 2017, entitled: "Filtering of Redundently Scheduled Write Passes ", 30 pages.

Sun Microsystems, "OpenSPARC T1 Microarchitecture Specification", www.sun.com, Part No. 819-6650-11, Apr. 2008, pp. 1-268.

* cited by examiner

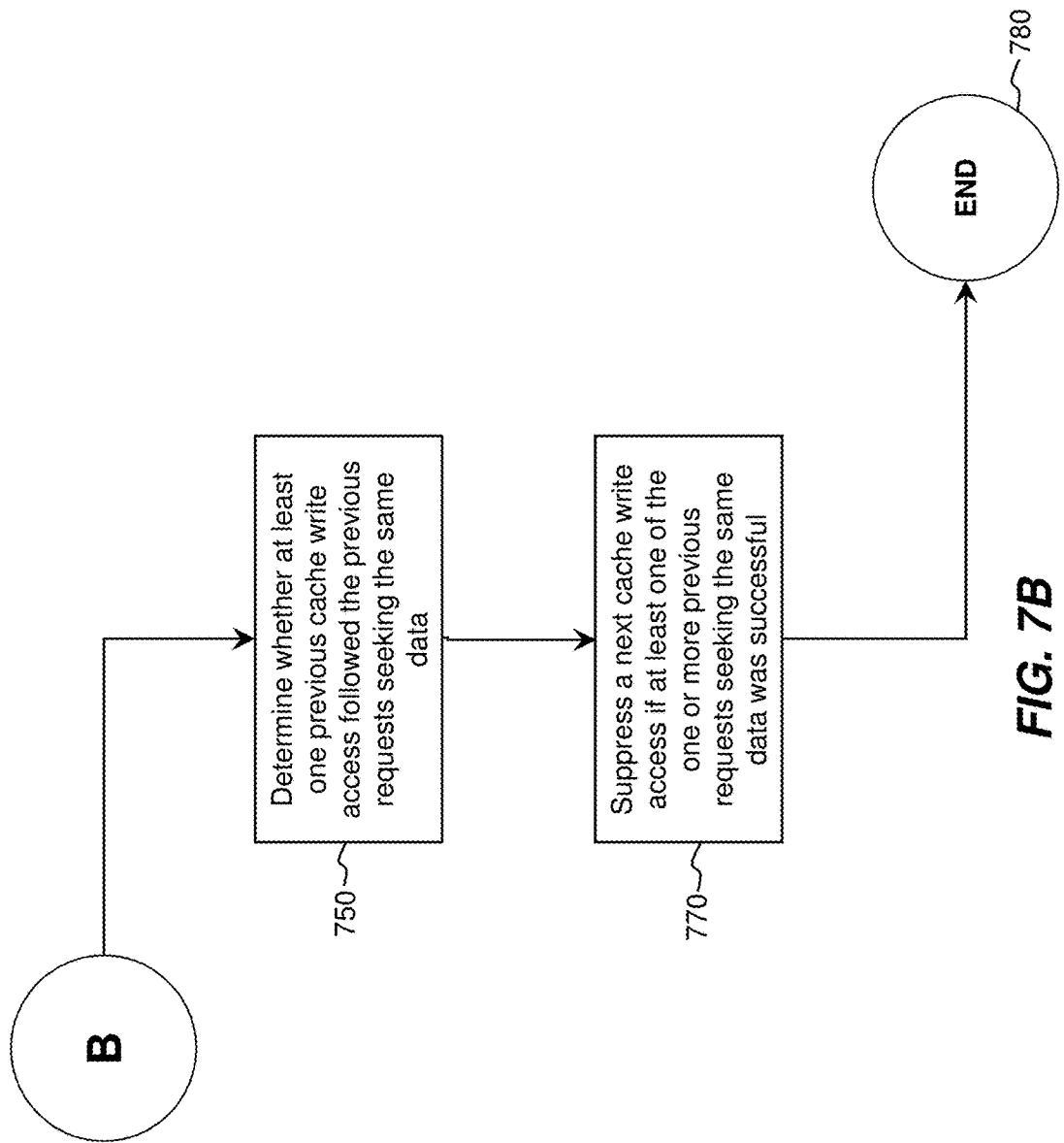

FILTERING OF REDUNDANTLY SCHEDULED WRITE PASSES

BACKGROUND

The present invention relates generally to the field of computer memory cache access via computer instructions, and more particularly to improving processor efficiency in the course of memory caching by filtering of unnecessary cache accesses.

BRIEF SUMMARY

Embodiments of the present invention disclose a method, system, and computer program product for refining access to a cache by a processing unit. One or more previous requests to access data from a cache are stored. A current request to access data from the cache is retrieved. A determination is made whether the current request is seeking the same data from the cache as at least one of the one or more previous requests. A further determination is made whether the at least one of the one or more previous requests seeking the same data was successful in arbitrating access to a processing unit when seeking access. A next cache write access is suppressed if the at least one of the one or more previous requests seeking the same data was successful in arbitrating access to the processing unit.

In a second embodiment, the present invention discloses a method, system, and computer program product for refining access to a cache by a processing unit. A determination is made whether a new stream of instructions has begun. A further determination is made whether a successful cache access has occurred in the new stream of instructions. A next cache write access is suppressed if the new stream of instructions has begun and the successful cache access has occurred.

In a third embodiment, the present invention discloses a method, system, and computer program product for refining access to a multilevel cache system by a processing unit. A determination is made whether a request to access data from a lower level cache in a multilevel cache system is likely to succeed. A further determination is made, if the request to access data is not likely to succeed, whether the request to access data from the lower level cache is redundant of a previous request. If the request to access data from the lower level cache is not redundant, a cache write access is scheduled. Data is requested from a higher level cache. The requested data from the higher level cache is awaited. If the request to access data from the higher level cache is not successful, a subsequent cache write access is scheduled.

BRIEF DESCRIPTION OF THE DRAWINGS

FIGS. 7A and 7B are a flowchart illustrating operational steps in filtering of redundant cache write accesses, in accordance with the first embodiment of the invention.

DETAILED DESCRIPTION

Nearly every modern processor uses memory caching to access more frequently needed data in the fastest manner possible, rather than always directly accessing main system memory. First, second, third, and even, in some processor designs, fourth and even higher level caches each present fast, and progressively larger locations from the processor to store and write data, and even though each cache level is more distant from the microprocessor, all cache levels are closer and allow faster access than accesses from main system memory. The goal of the caches' availability very close to the processor, is to improve memory search times for frequently needed data, with the end result of a reduction of the time needed to execute.

Cache access, as with other computer processes, occurs via instructions executed by the processor. Each "stream" of instructions may include, for example, one or more "read" passes, in which data is sought to be accessed from a cache, followed by one or more "write" passes, in which the data read is written elsewhere in the computer system, as well as various other steps. The scheduled write passes may also allow for rescheduling the read pass if it is missed so that data can be delivered in the fastest way possible (because of a failure to arbitrate access or because of data existing in a higher level cache).

Regardless of whether the data sought is actually obtained from a cache in a read pass (also known as a "read access" or a "read cache access"), or is predicted to be successfully obtained, because of the nature of instructions in which instructions executed in a sequential order, if data is successfully obtained in a "read" pass or is not predicted to be successfully obtained, at least one subsequent "write" pass (also known as a "write access" or a "write cache access") may need to be descheduled, because the previous "read" pass has succeeded. These "write" passes are unnecessary, waste processor time and generate heat within the microprocessor by their execution. It is disadvantageous, however, to simply remove from scheduling every "write" pass following a "read" pass, despite their duplicity. Some duplication allows for a quicker execution if a previous instruction is blocked simply because of a simultaneous access to the processor in a multi-threaded application, or for any other reason.

Presented is a system, method, and computer program product for removing from scheduling redundant and unnecessary cache write accesses (also known as "write passes") if they are not needed while still allowing the benefits of redundant "write" requests.

Figure 1:
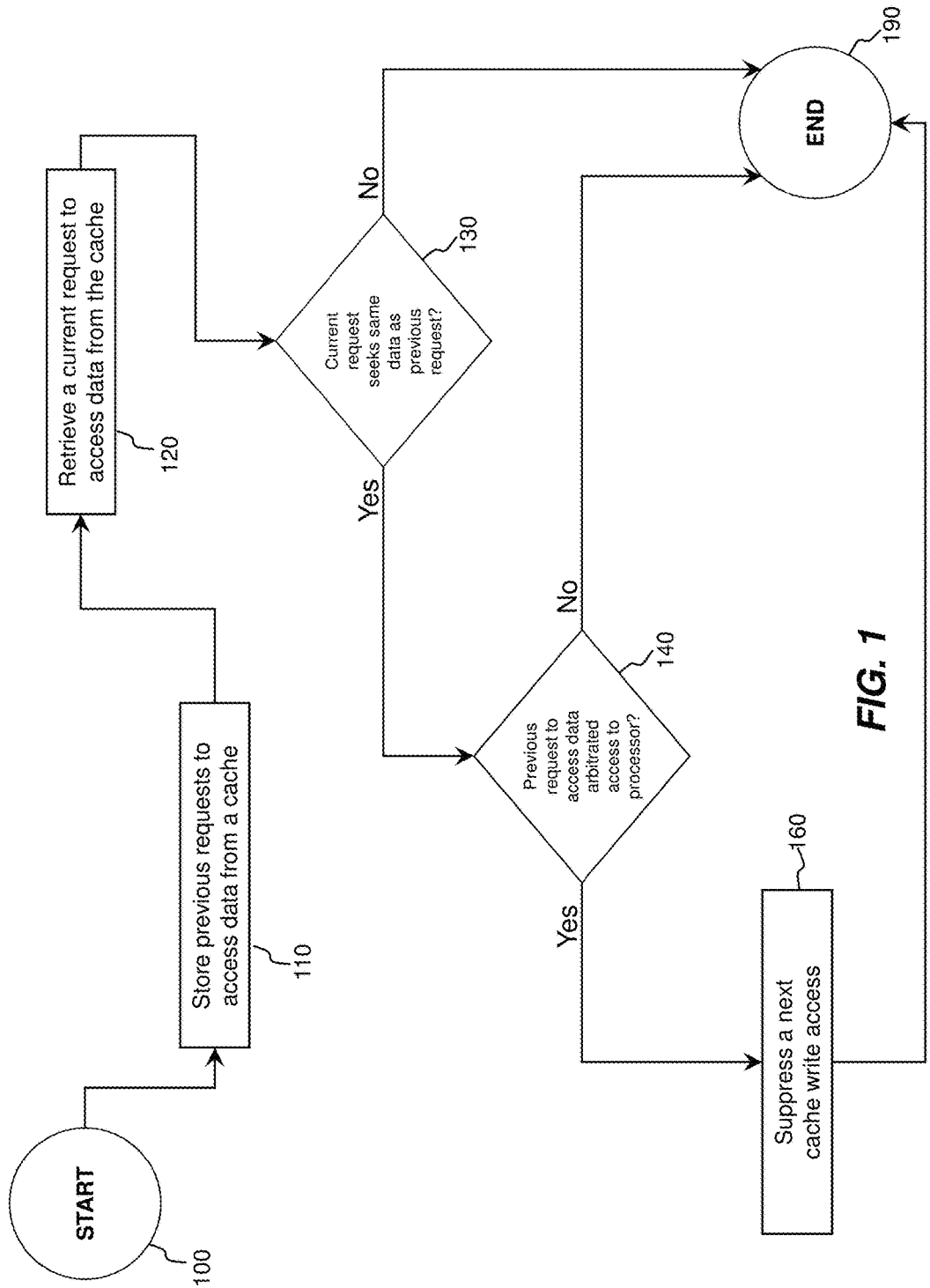
FIG. 1 is a process flow diagram illustrating operational steps in filtering of redundant cache write accesses, in accordance with a first embodiment of the invention.

FIG. 1 is a process flow diagram in accordance with a first embodiment of the invention, illustrating operational steps in filtering of redundant cache write accesses to improve operation of a processing unit via streamlining of instructions executing on the processing unit. As is commonly understood by one of skill the in the art, the "processing unit" may be a traditional single core processor, or any of a multi-core processor, a co-processor, a separate microprocessor executing separate instructions, etc. Execution of the first embodiment begins at start 100. Note, start 100 does not necessarily signify beginning of execution of instructions by the processing unit, it merely signifies beginning of execution of various aspects of the first embodiment, as discussed herein. At step 110, one or more previous requests to access data from a cache are stored for later use. The previous requests, in this first embodiment, are requests to access data from a single level cache, or requests to access data from any level of a multilevel cache associated with the processing unit. The previous requests are previous "read" passes occurring in previously executed instructions that have attempted to access data from the cache.

At step 120, a current request to access data from the cache is retrieved. The current request is currently executing in instructions, has just executed, or will execute by the processing unit very shortly. At step 130, a determination is made whether the current request is seeking the same data as at least one of the one or more previous requests (which were stored at step 110). The current request and any one of the previous request(s) may be seeking the same data if each is accessing the same logical address within a cache directory. The logical address of the cache directory references a cache memory location within the cache, and if the same logical address is accessed by the current request and at least one previous request (and no changes have occurred at any time), the two or more requests are identical. If the current request and none of the previous requests are seeking the same data, execution of the first embodiment terminates at end 190. If, on the other hand, it is determined that the current request is seeking the same data as at least one of the one or more previous requests, execution continues to 140.

At step 140, a determination is made whether at least one of the one or more previous requests seeking the same data was successful in arbitrating access to the processing unit when seeking access. In effect, the processing unit determines that not only was at least one of the previous request(s) to access data seeking the same data (at step 130), but also that the previous request to access data was successful (i.e. the processing unit was not blocked by another thread, load/store unit was not accessing the processing unit at the same time, some other concurrent read/write blocked access, or any other reason). If none of the previous requests seeking the same data arbitrated successfully, execution of the first embodiment terminates 190. If, on the other hand, if at least one of the previous requests seeking the same data successfully arbitrated access, execution may proceed directly to step 160, where a next cache write access is suppressed as unnecessary. This serves to increase efficiency of the processing unit, as discussed above. Optionally, after determining at step 140 that a previous request seeking the same data successfully arbitrated access to the processing unit, execution proceeds to step 160 and access to the next cache write access is suppressed, for improving of the efficiency of the processing unit. Access to the next cache write access may prevent concurrent read accesses by the processing unit, if not suppressed.

Execution finally proceeds to end 190, in any outcome. Note that end 190, as shown in FIG. 1, does not necessarily signify end of execution of the instructions for the processing unit, but merely signifies end of execution of the first embodiment (i.e., the processing unit is no longer considering suppressing a next cache write access 160), but this is no way prohibits the first embodiment from restarting at start 100, other instructions executing, etc.

Figure 2:
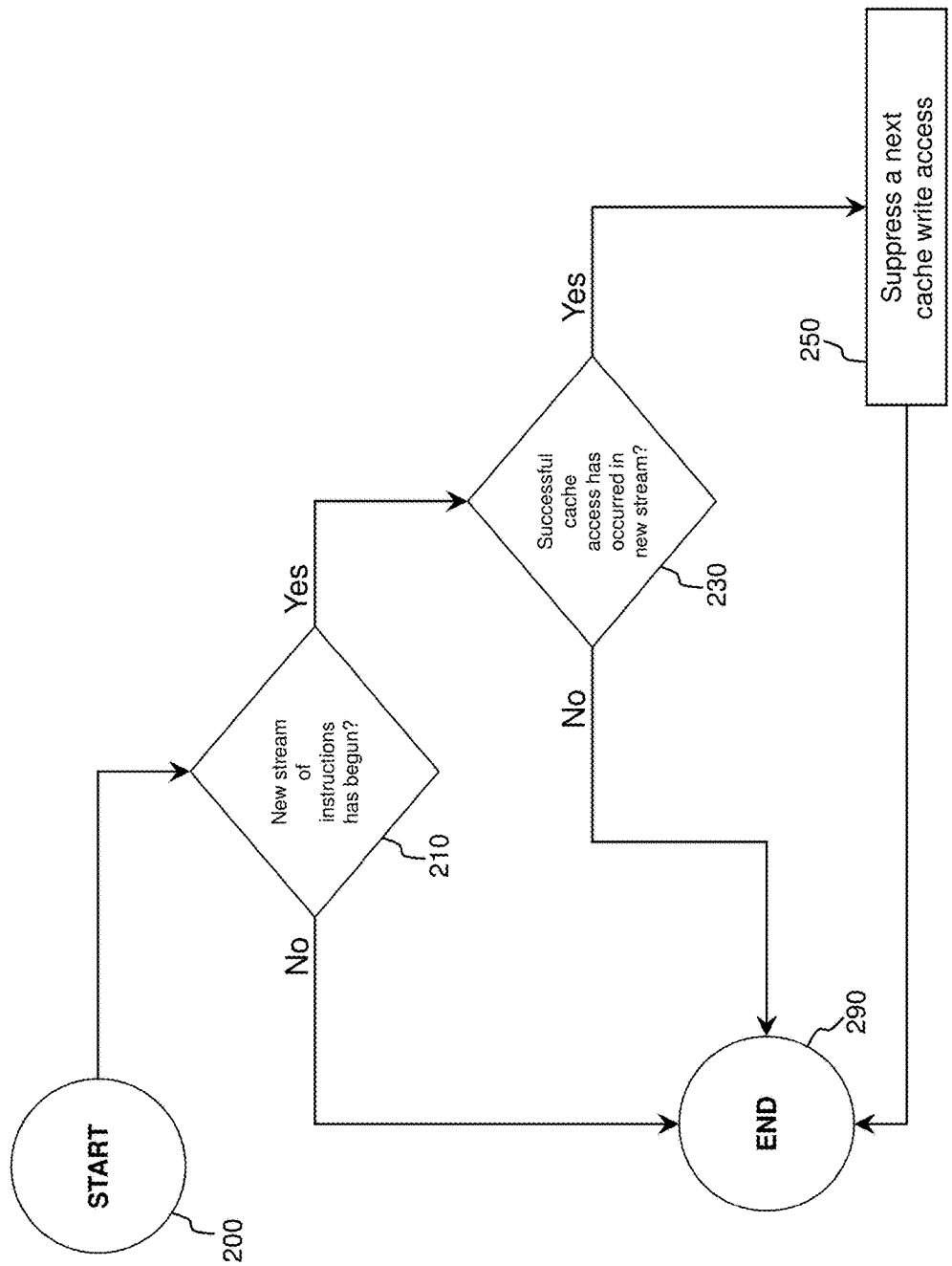
FIG. 2 is a process flow diagram illustrating operational steps in filtering of redundant cache write accesses, in accordance with a second embodiment of the invention.

FIG. 2 is a process flow diagram illustrating operational steps in filtering of redundant cache write accesses during access of a cache, in accordance with a second embodiment of the invention. The cache may be single, or any level of a multilevel cache system. Execution begins at start 200. Note, start 200 does not necessarily signify beginning of execution of instructions by the processing unit, it merely signifies beginning of execution of various aspects of the second embodiment, as discussed herein. At step 210, a determination is made by a processing unit whether a new stream of instructions has begun, such as executing in one processor thread. In practice, the processing unit may determine whether a new stream of instructions has begun by determining whether a hold latch has been reset, although other means of determining whether a new stream of instructions has begun are possible, and specifically contemplated herein. If the processing unit does not determine that a new stream of instructions has begun, execution contains to end 290. Note that end 290, as shown in FIG. 2, does not necessarily signify end of execution of the instructions for the processing unit, but merely signifies end of execution of the second embodiment (i.e., the processing unit is no longer considering suppressing a next cache write access 250), but this is no way prohibits the second embodiment from restarting at start 200, other instructions executing, etc. If at step 210, the determination is made by the processing unit that the new stream of instructions has begun, execution continues to step 230.

At step 230, the processing unit determines whether a successful cache access has occurred in the new stream of instructions. The successful cache access may occur at anytime after the new stream of instructions has begun. In practice, the processing unit may determine whether the successful cache access has occurred by determining whether the hold latch has been set (which occurs after successful cache access). If the processing unit determines successful cache access has not occurred, execution proceeds to end 290 (as discussed above). If the processing unit determines successful cache access has occurred, execution continues to step 250, and a next cache write access is suppressed. The next cache write access may also prevent concurrent read access, so suppressing of unnecessary cache write accesses may further allow for fast execution of the remainder of the instructions, decreased heat generation, as well as other benefits. The processing unit may further prevent all other unexecuted cache write accesses after successful cache access has occurred (and the hold latch set, etc.).

In any event, execution eventually proceeds to end 290. Note that end 290, as shown in FIG. 2, does not necessarily signify end of execution of the instructions for the processing unit, but merely signifies end of execution of the second embodiment (i.e., the processing unit is no longer considering suppressing a next cache write access 250), but this is no way prohibits the second embodiment from restarting at start 200, other instructions executing, etc.

Figure 3:
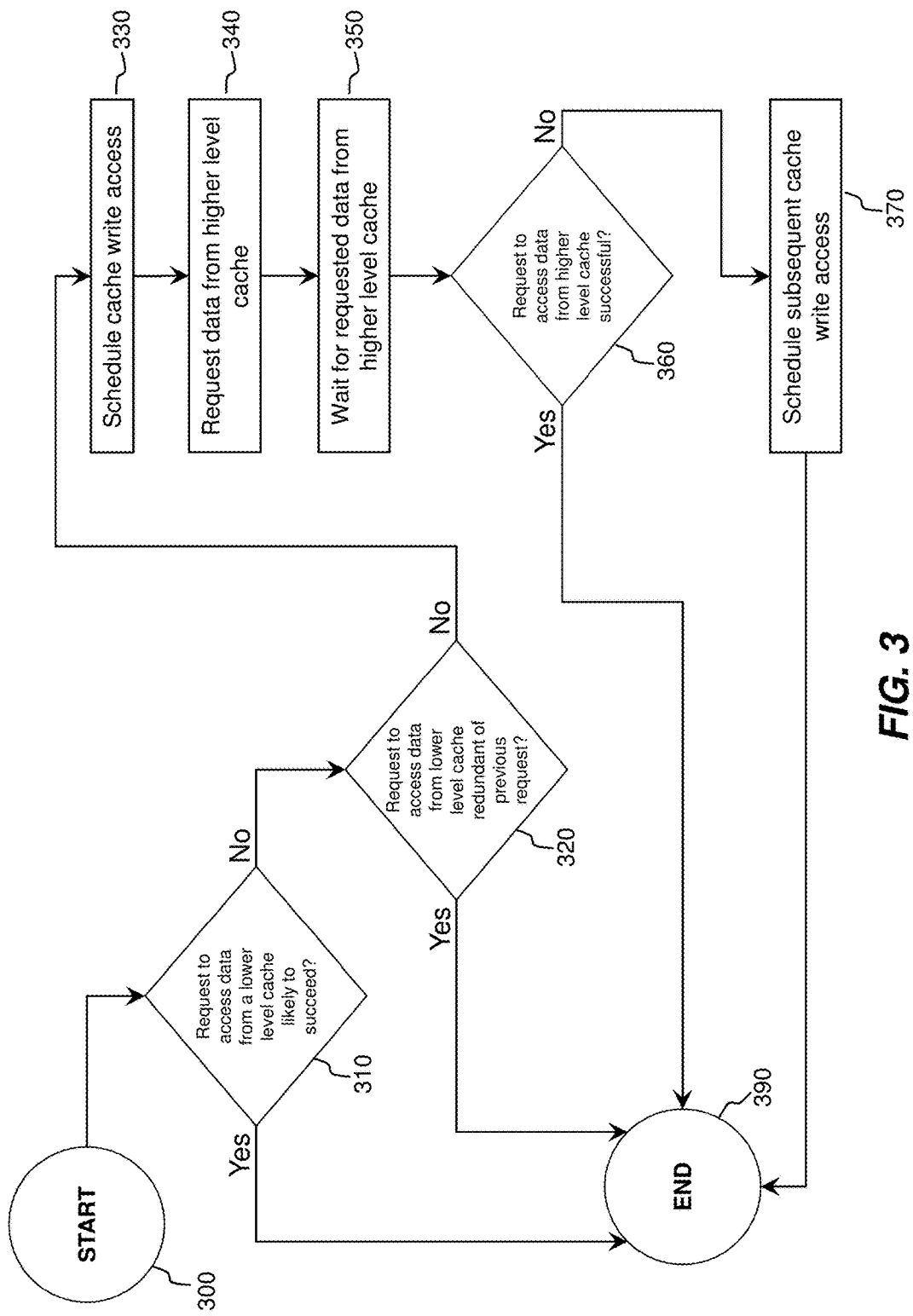
FIG. 3 is a process flow diagram illustrating operational steps in filtering of redundant cache write accesses, in accordance with a third embodiment of the invention.

FIG. 3 is a process flow diagram illustrating operational steps in filtering of redundant cache write accesses, in accordance with a third embodiment of the invention. Execution begins at start 300. Note, start 300 does not necessarily signify beginning of execution of instructions by the processing unit, it merely signifies beginning of execution of various aspects of the third embodiment, as discussed herein. At step 310, a determination is made whether a request to access data from a lower level cache in a multilevel cache system is likely to succeed. The multilevel cache system may have three cache levels or four cache levels. Determining whether a request to access data from the cache may involve a determination of whether the request will successfully arbitrate access to the cache. If the request to access data from the lower level cache is likely to succeed, execution terminates at end 390. On the other hand, if a determination is made at step 310 that the request to access data from the lower level cache is not likely to succeed, execution continues to step 320. At step 320, a determination is made whether the request to access data from the lower level cache is redundant of a previous request. If it is determined the request is redundant, execution terminates at end 390. If it is determined that the request to access data from the lower level cache is not redundant, execution proceeds to step 330 and a cache write access is scheduled, and at step 340, data is requested from a higher level cache. At step 350, the processing unit waits for the requested data from the higher level cache. At step 360, a determination is made whether the request to access data from the higher level cache was successful. If it was successful and the requested data was found, execution proceeds to end 390. If the request to access data from the higher level cache is not successful, execution proceeds to step 370, where a subsequent cache write access is scheduled. Execution eventually proceeds to end 390. Note that end 390, as shown in FIG. 3, does not necessarily signify end of execution of the instructions for the processing unit, but merely signifies end of execution of the third embodiment, but this is no way prohibits the third embodiment from restarting at start 300, other instructions executing, etc.

Figure 4A:
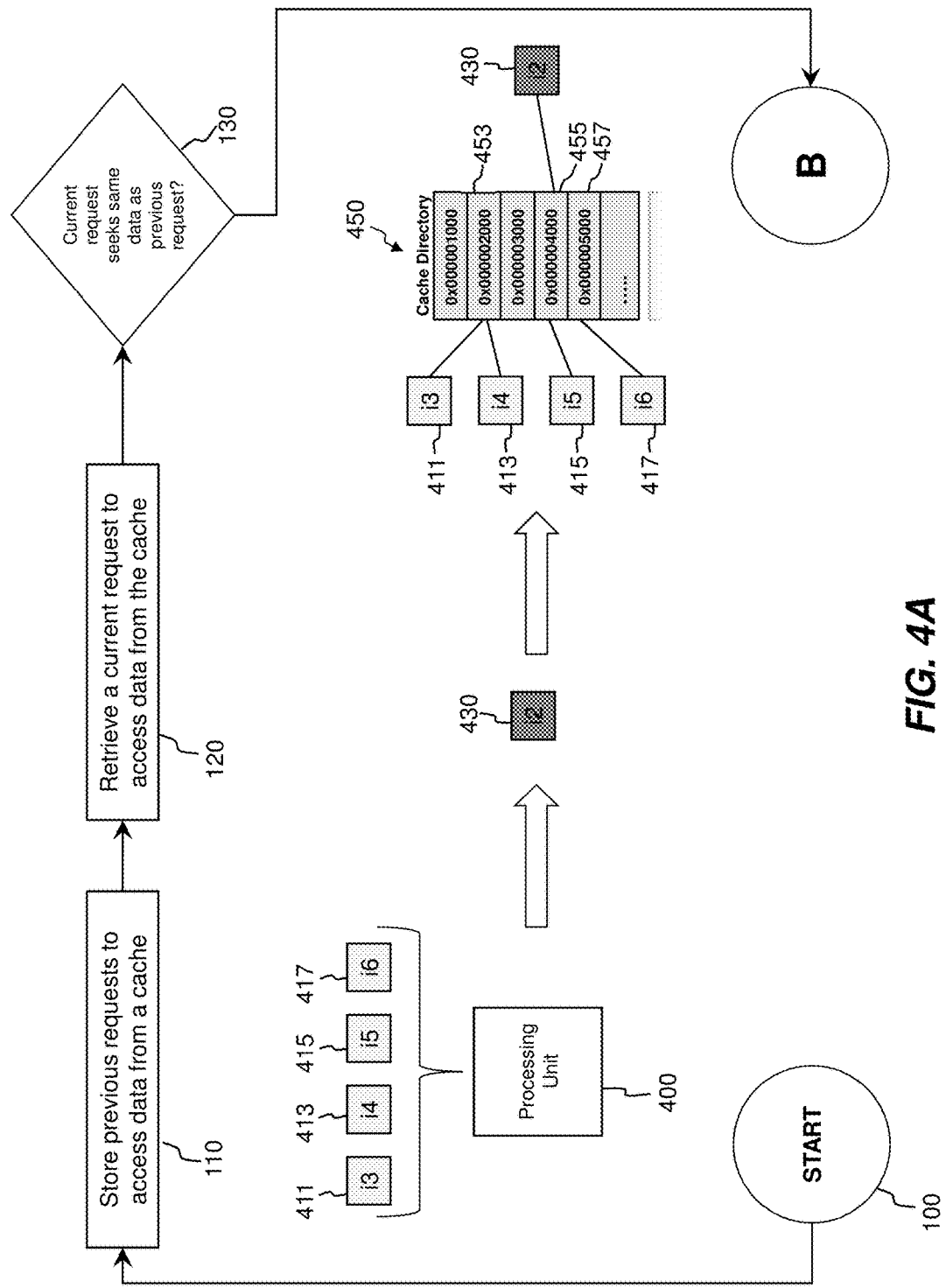
FIGS. 4A and 4B are a functional block diagram illustrating a process of filtering of redundant cache write accesses, in accordance with the first embodiment of the invention.
Figure 4B:
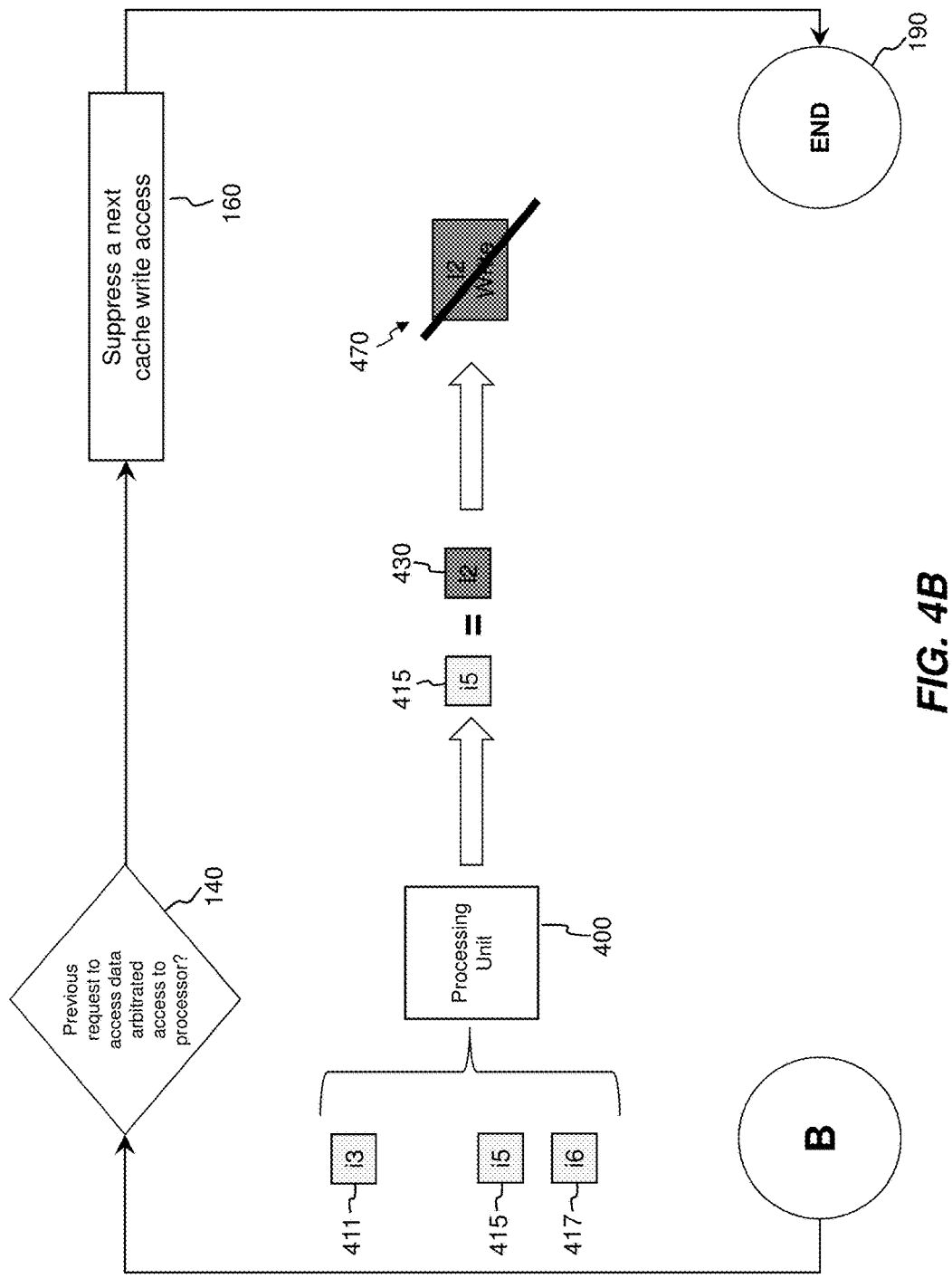

FIGS. 4A and 4B are is a functional block diagram illustrating a process of filtering of redundant cache write accesses, in accordance with the first embodiment of the invention. Steps from FIGS. 1 (100, 110, 120, 130, 140, 160, and 190) are shown for comparison purposes. Execution begins at start 100. As shown in FIG. 1, at step 110 one or more previous requests (411-417) to access data from a cache are stored. The processing unit 400 stores previous read request i3 (411), previous read request i4 (413), previous read request i5 (415), and previous read request i6 (417). The read requests i3, i4, i5, and i6 (411-417) previously occurred in computer instructions. Each previous read request (411-417) is associated with data regarding which logical address of memory in a cache was addressed, and whether each previous read request (411-417) was successful when previously executed, etc. All previous read requests i3, i4, i5, and i6 (411-417) are stored in a form accessible to the processing unit 400 for later use. At step 120, a current request (430) to access data from the cache is retrieved. The current request is a read request in instruction cycle i2, as displayed 430.

At step 130, a determination is made whether the current request 430 is seeking the same data as at least one of the previous requests (411-417) in cache directory 450. Depending upon the level of the cache involved and system architecture, cache directory 450 may be replaced by a translation look aside buffer (not shown). The processing unit 400 accesses stored data regarding previous requests (411-417). Previous read request i3 (411) and previous read request i4 (413) have attempted to access logical address 0x000002000 (453) in cache directory 450. Previous read request i5 (415) has attempted to access logical address 0x000004000 (455) in cache directory 450. Previous read request i6 (417) has attempted to access logical address 0x000005000 (457). Current request 430 is also seeking data at logical address 0x000004000 (455) in cache directory 450. The processing unit 400 has thus determined that current request 430 is seeking the same data as previous request i5 415, specifically data at logical address 0x000004000 (455) in cache directory 450.

At step 140, a determination is made by the processing unit 400 whether at least one of the one or more previous requests (411-417) was successful in arbitrating access to the processing unit when seeking access. In effect, a determination is made whether when one of the one or more previous requests 411-417, when executed, successfully accessed data at the specified logical address, and did not fail such as because the processing unit 400 was blocked by another thread, load/store unit access to the processing unit 400 was occurring, or for any other reason. The processing unit 400 determines that previous read request i3 (411), previous read request i5 (415), and previous read request i6 (417) were successful in arbitrating access to the processing unit 400, but since only previous read request i5 (415) was seeking the same data, only this previous read request is considered. The processing unit 400 therefore determines that previous read request i5 (415) is equivalent to current request i2 (430), and that previous read request i5 (415) was successful in arbitrating access to the processing unit 400. At step 160, after making this determination, the processing unit 400 suppresses access to the i2 cache write access 470. This cache write access 470 would be duplicative of a previous cache write access and is now not necessary. Execution then proceeds to end 190.

Figure 5:
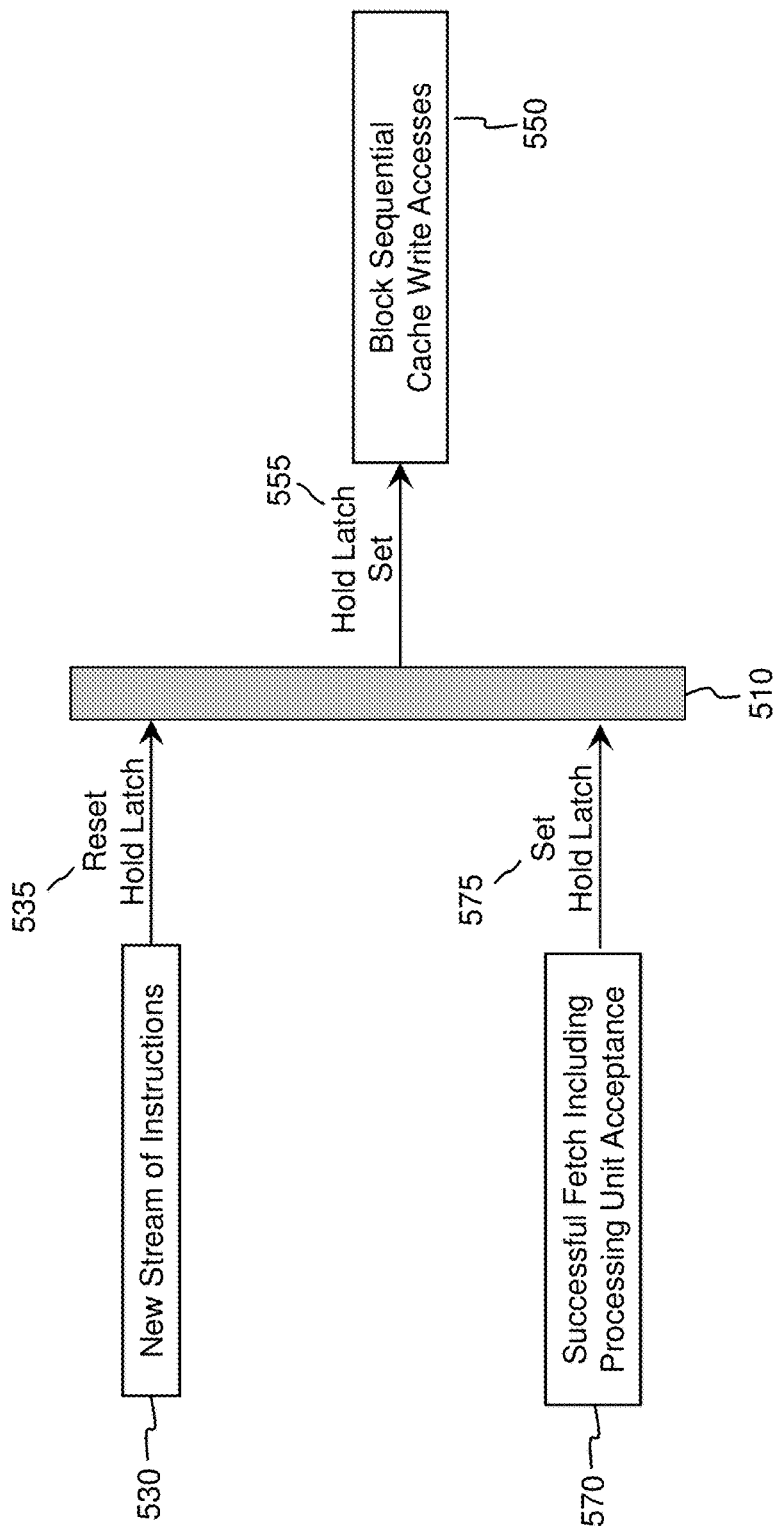
FIG. 5 is a functional block diagram illustrating a sample execution of computer instructions, in accordance with the second embodiment of the invention.

FIG. 5 is a functional block diagram illustrating sample execution of computer instructions, in accordance with the second embodiment of the invention. A hold latch is represented 510, the hold latch having use as subsequently described. At 530, a new stream of instructions begins. The beginning of the new stream of instructions 530 causes the processing unit to reset 535 the hold latch 510. As execution continues, while the hold latch 510 is set 555, sequential cache write accesses within the stream of instructions are continuously blocked 550. This occurs after the hold latch 510 is set 575, because of a successful cache access (i.e. a "fetch"), including processing unit acceptance 570. After this point, sequential cache write accesses are blocked, and execution continues. This serves to save processor time and energy.

Figure 6:
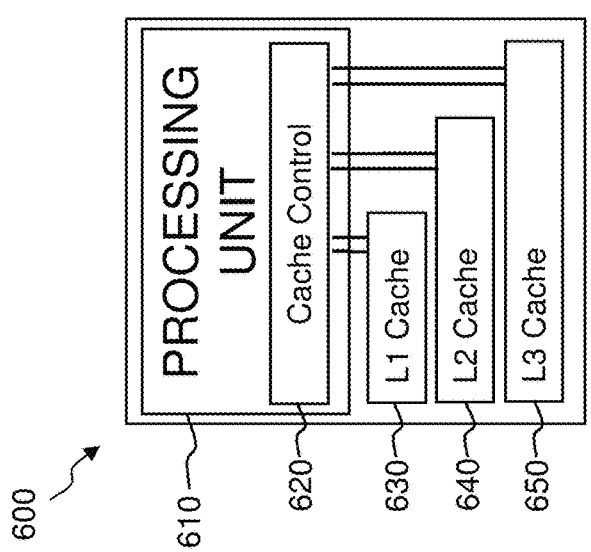
FIG. 6 is a functional block diagram illustrating an environment for filtering of redundant cache write accesses, in accordance with the third embodiment of the invention.

FIG. 6 is a functional block diagram illustrating an environment for filtering of redundant cache write accesses, in accordance with the third embodiment of the invention. Displayed is a processing unit 600 with a multilevel cache system 630, 640, 650 and cache control 620. Cache control may be replaced or supplemented by a translation look aside buffer (not shown), depending upon system architecture. Three cache levels 630, 640, 650 are available in the multilevel cache system: an L1 cache 630, an L2 cache 640, and an L3 cache 650. Cache control 620 supports determinations of whether a request to access data from one of the caches 630, 640, 650 is likely to succeed before actual execution, such as via a "set predictor" (as well as provides other functionality). The cache control 620 may also contain a cache directory (containing a list of resource entries available in each cache). Each cache 630, 640, 650 may contain a "data array" which is an array of data stored within the cache. L1 cache 630 is a lower level cache as compared to L2 cache 640 and L3 cache 650, whereas the L2 cache 640 and the L3 cache 650 are the higher level caches. As between the L2 cache 640 and the L3 cache 650, the L2 cache 640 is the lower level cache whereas the L3 cache 650 is the higher level cache, etc. As understood by one of the skill in the art, each cache level beginning with the L1 cache 630 is progressively larger and more distant from the processing unit 610, but also progressively slower to access and write to, but all three cache levels 630, 640, and 650 are faster to access than main system memory (not shown here).

Figure 7A:
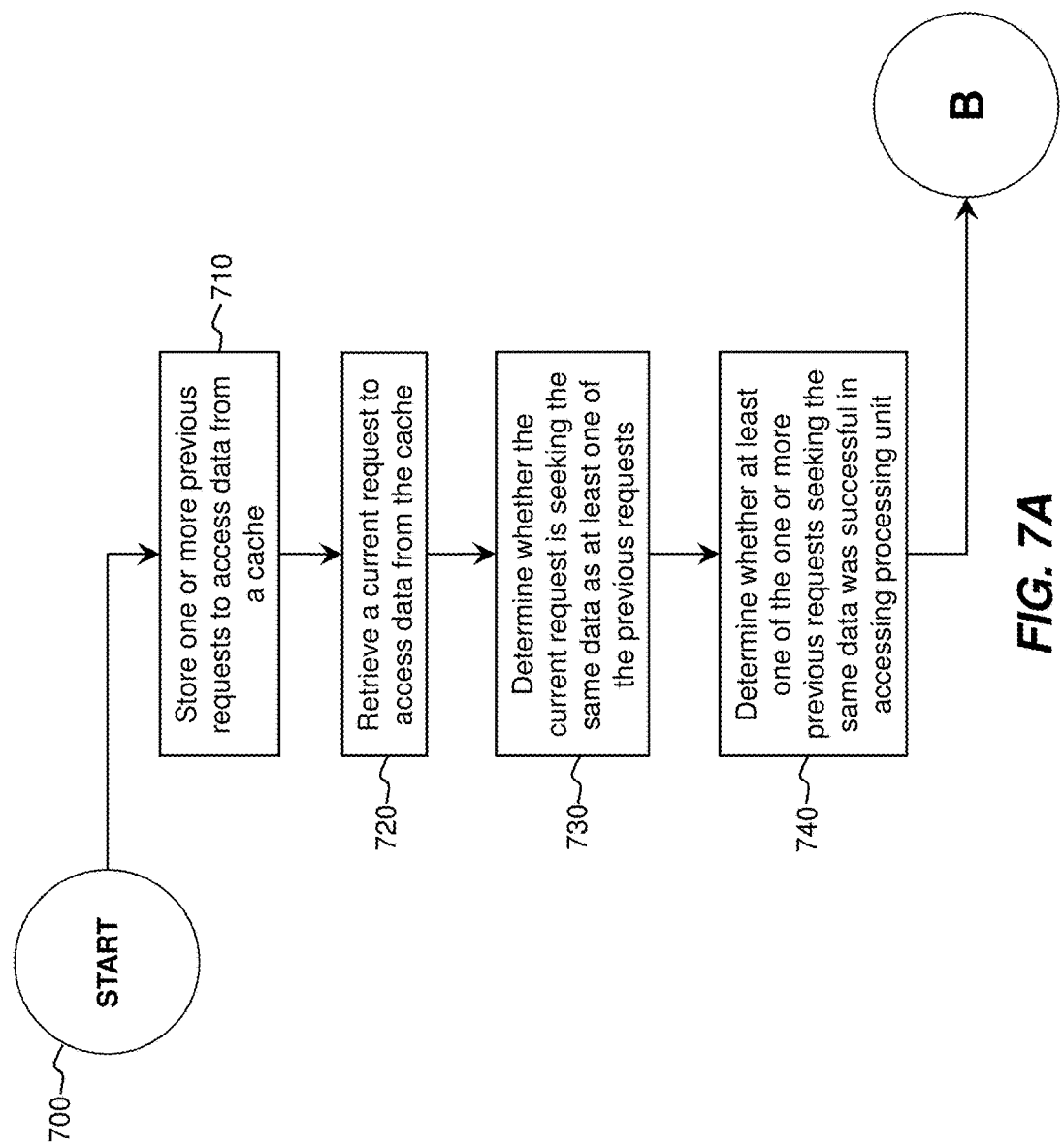

FIGS. 7A and 7B are a flowchart illustrating operational steps in filtering of redundant cache write accesses, in accordance with the first embodiment of the invention. At step 700, execution begins. At step 710, one or more previous requests to access data from a cache are stored. The previous requests are "read" cache accesses. At step 720, a current request to access data from the cache is retrieved. The current request is also a "read" cache access. At step 730, a determination is made whether the current request is seeking the same data from the cache as at least one of the one or more previous requests (such as if the same logical address of a cache directory is sought by both).

At step 740, a determination is made whether at least one of the one or more previous requests seeking the same data was successful is arbitrating access to the processing unit. At step 750, a determination is made whether at least one previous cache write access followed the previous requests seeking the same data. At step 770, a next cache write access is suppressed if at least one of the one or more previous requests seeking the same data was successful in arbitrating access to the processing unit. Execution proceeds to end at step 780.

Figure 8:
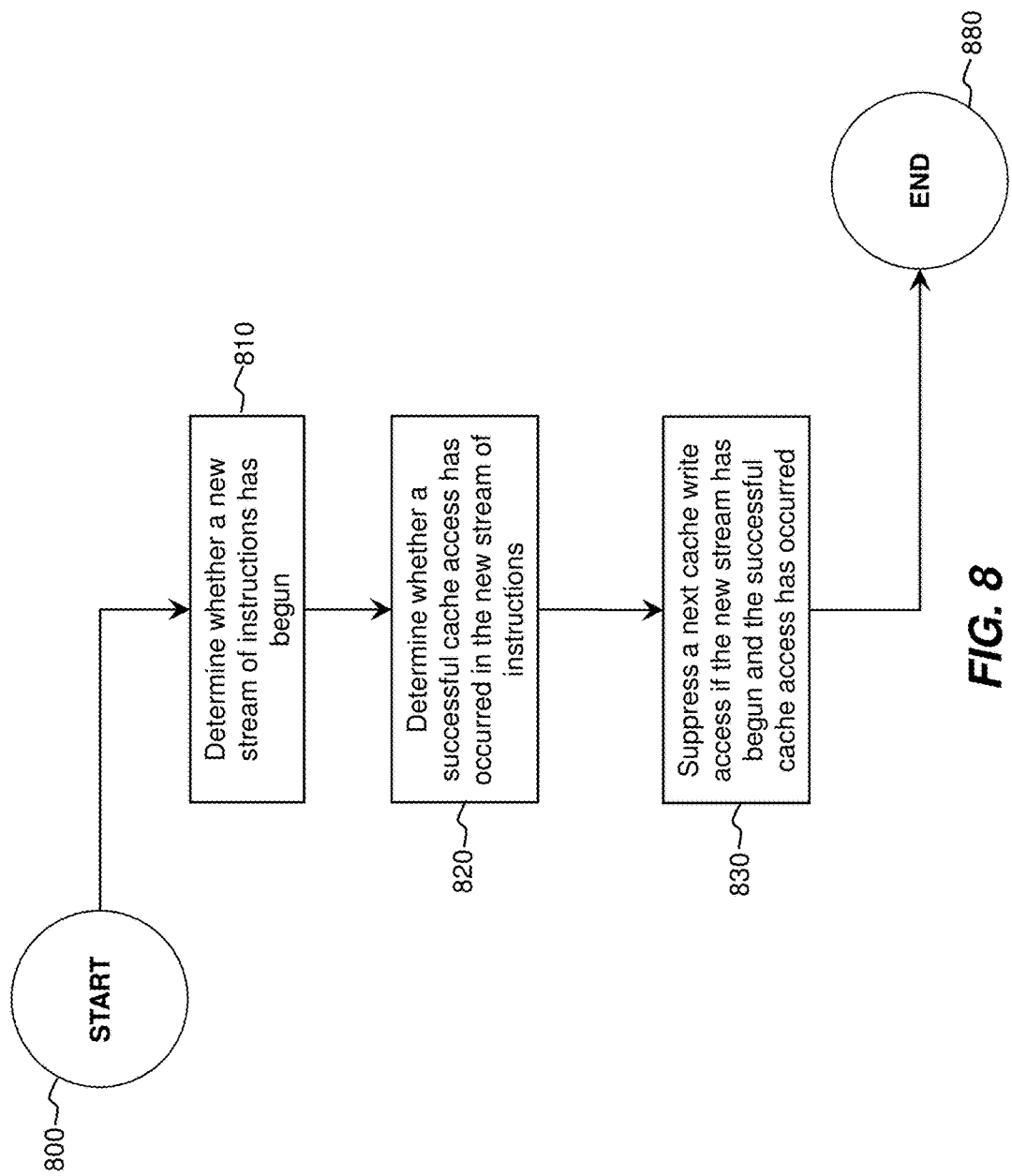
FIG. 8 is a flowchart illustrating operational steps in filtering of redundant cache write accesses, in accordance with the second embodiment of the invention.

FIG. 8 is a flowchart illustrating operational steps in filtering of redundant cache write accesses, in accordance with the second embodiment of the invention. Execution begins at start 800. At step 810, the processing unit determines whether a new stream of instructions has begun (such as in one thread of a multithreaded processor). The new stream of instructions may cause the processing unit to reset a hold latch, which is utilized by the processing unit to determine that the new stream of instructions has begun. At step 820, the processing unit makes a determination whether a successful cache access has occurred in the new stream of instructions. The successful cache access may cause the processing unit to set the hold latch, which allows the processing unit to determine that the successful cache access has occurred. The successful cache access may occur at any time after the new stream of instructions has begun. At step 830, the processing unit suppresses a next cache write access if the new stream of instructions has begun and the successful cache access has occurred. All subsequent cache write accesses may be suppressed until after the successful cache access has occurred. Each cache write access may suppress concurrent read accesses. Execution proceeds to end 880.

Figure 9A:
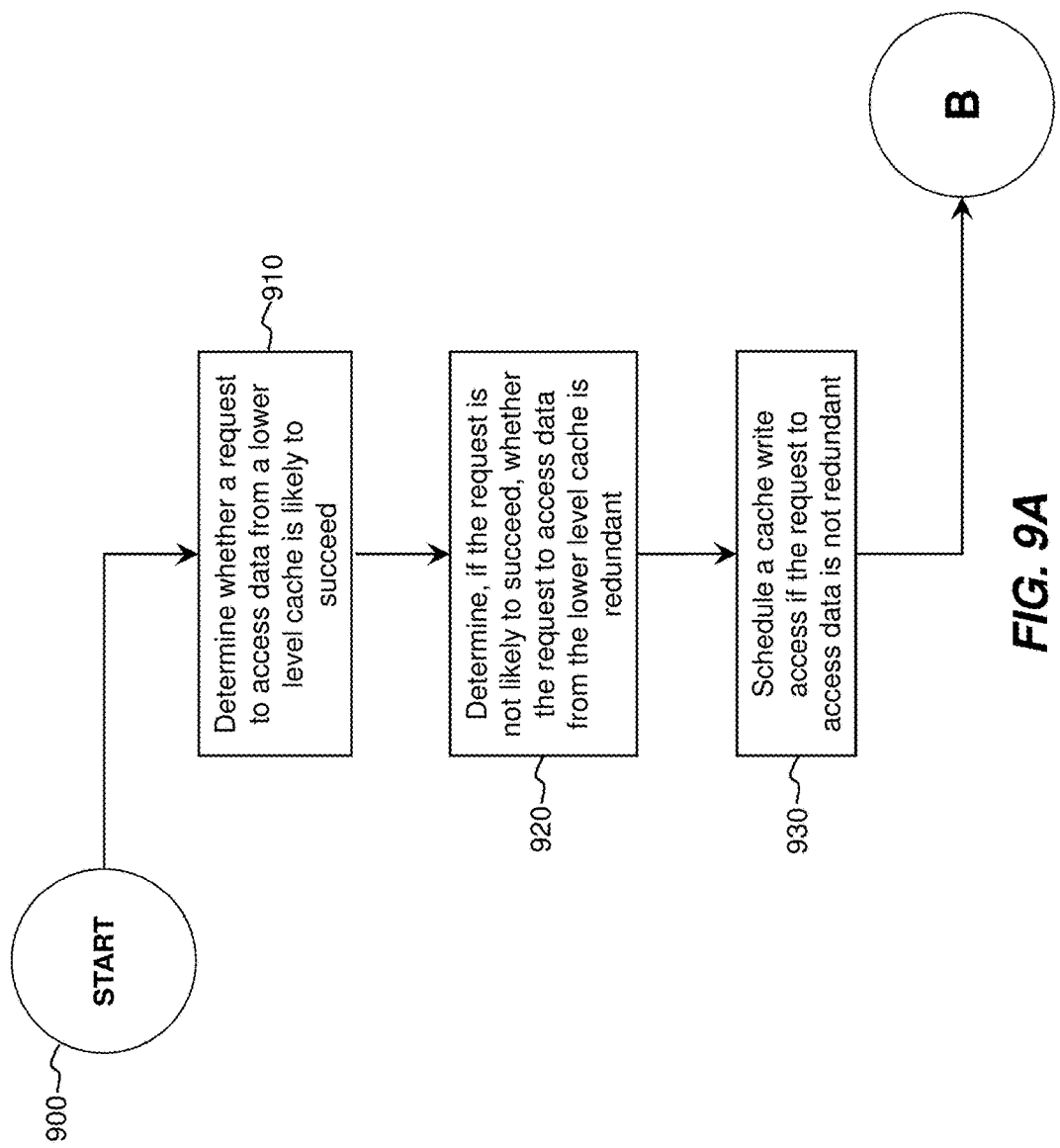
FIGS. 9A and 9B are flowchart illustrating operational steps in filtering of redundant cache write accesses, in accordance with the third embodiment of the invention.
Figure 9B:
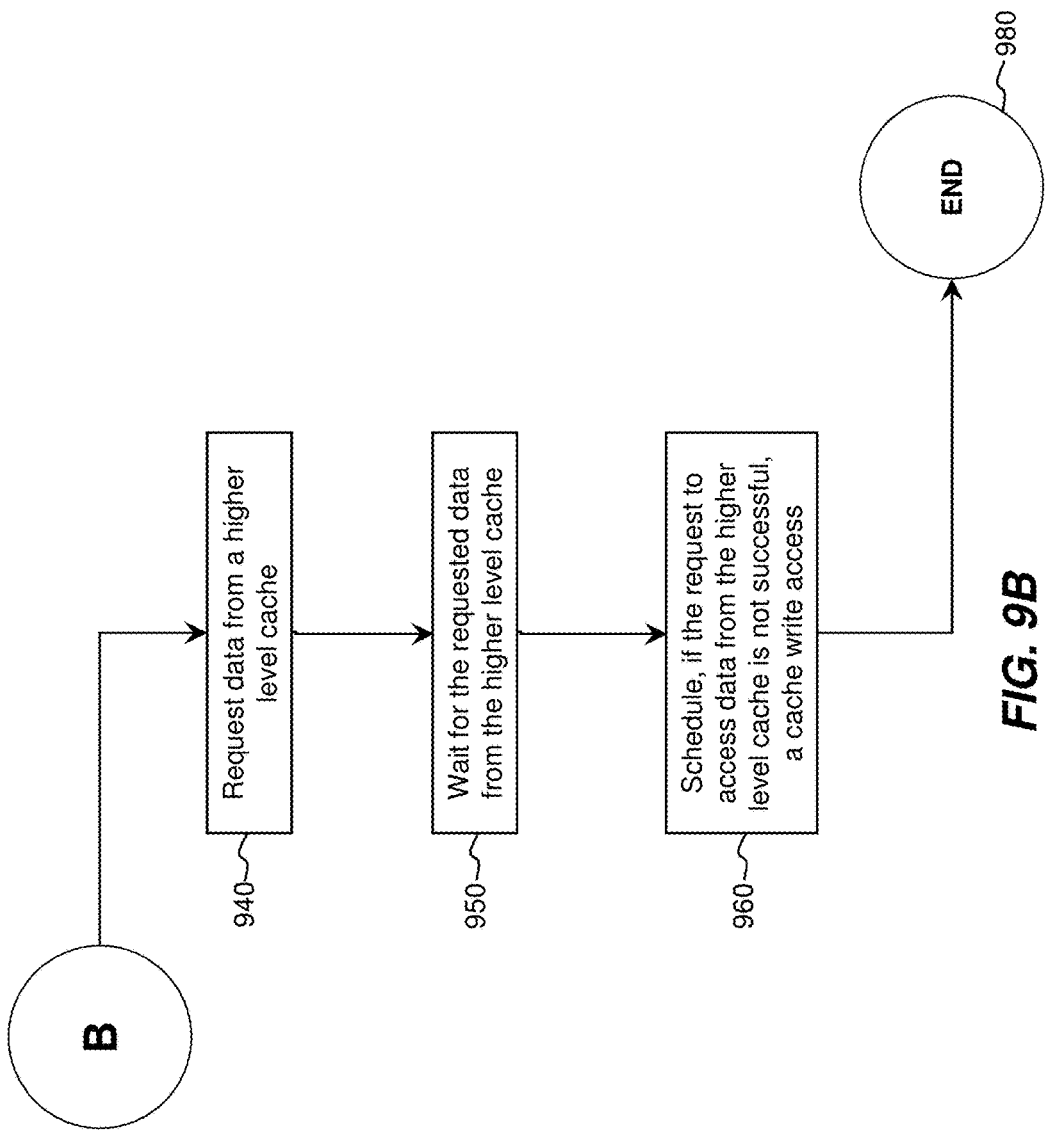

FIGS. 9A and 9B are a flowchart illustrating operational steps in filtering of redundant cache write accesses, in accordance with the third embodiment of the invention. Execution begins at start 900. At step 910, the processing unit determines whether a request to access data from a lower level cache in a multilevel cache system is likely to succeed. The lower level cache may be a first level cache, such as displayed 620. The multilevel cache system may have three or four levels, as displayed 630-650 (or some other number). When determining whether the request to access data from the lower level cache is likely to succeed, the processing unit may determine if the request will successfully arbitrate access among multithreaded execution. If it is determined that the request to access data from the lower level cache is not likely to succeed, the processing unit determines at step 920 whether the request to access data from the lower level cache is redundant of a previous request. When determining whether the request to access data from the lower level cache is redundant of the previous request, the processing unit may determine whether the same data was sought by both the request and the previous request.

At step 930, if the request to access data from the lower level cache is not redundant, a cache write access is scheduled. All cache write accesses may prevent concurrent read accesses, depending upon system architecture, so limiting them may be useful for saving processor time, battery life, lowering heat generation by the processing unit, etc. At step 940, data is requested by the processing unit from a higher level cache. The higher level cache may be an L2 cache 640 or an L3 cache 650. At step 950, the processing unit waits for the requested data from the higher level cache. The "waiting" may actually take a significant period of time, or occur quickly. If the request to access data from the higher level cache is not successful, at step 960 a subsequent cache write access is scheduled at step 960. Execution proceeds to end 980.

Based on the foregoing, a computer system, method and program product have been disclosed for filtering of redundantly scheduled write passes. However, numerous modifications and substitutions can be made without deviating from the scope of the present invention. The embodiments herein may be combined, altered, or portions removed. Therefore, the present invention has been disclosed by way of example and not limitation.

What is claimed is:

1. A method of improving access to a cache by a processing unit, the method comprising:
   storing one or more previous requests to access data from a cache;
   retrieving a current request to access data from the cache, wherein the current request will execute in a stream of instructions, the stream of instructions including one or more read passes followed by one or more write passes;
   determining whether the current request is seeking the same data from the cache as at least one of the one or more previous requests;
   determining whether the at least one of the one or more previous requests seeking the same data was successful in arbitrating access to a processing unit when seeking access; and
   suppressing a next cache write access in a write pass in the stream of instructions if the at least one of the one or more previous requests seeking the same data was successful in arbitrating access to the processing unit if not suppressed, wherein the next write cache access prevents concurrent read accesses.

2. The method of claim 1, wherein when determining whether the current request is seeking the same data as at least one of the one or more previous requests, the processing unit determines whether the current request and at least one of the one or more previous requests are each seeking to access a same logical address of a cache directory.

3. The method of claim 1, wherein the cache is selected from a group consisting of a first level cache, a second level cache, a third level cache, and a fourth level cache.

4. The method of claim 1, wherein the next cache write access prevents concurrent read accesses if not suppressed.

5. A method of improving access to a cache by a processing unit, the method comprising:
   determining whether a new stream of instructions has begun, the new stream of instructions including one or more read passes followed by one or more write passes;

determining whether a successful cache access has occurred in the new stream of instructions; and suppressing a next write cache access if the new stream of instructions has begun and the successful cache access has occurred, wherein the next write cache access prevents concurrent read accesses.

6. The method of claim 5, wherein the successful cache access occurs at any time after the new stream of instructions has begun.

7. The method of claim 5, wherein the successful cache access causes the processing unit to set a hold latch.

8. The method of claim 5, wherein the new stream of instructions causes the processing unit to reset the hold latch.

9. The method of claim 5, wherein the cache access is to a cache selected from a group consisting of a first level cache, a second level cache, a third level cache, and a fourth level cache.

10. The method of claim 5, wherein the instructions are executed in one processor thread.

11. The method of claim 5, wherein all unexecuted cache write accesses are suppressed after the successful cache access has occurred.

12. A method of improving access to a multilevel cache system by a processing unit, the method comprising:

determining whether a request to access data from a lower level cache in a multilevel cache system is likely to succeed, wherein the request will execute in a stream of instructions, the stream of instructions including one or more read passes followed by one or more write passes;

determining, if the request to access data is not likely to succeed, whether the request to access data from the lower level cache is redundant of a previous request;

scheduling, if the request to access data from the lower level cache is not redundant, a cache write access;

requesting data from a higher level cache;

waiting for the requested data from the higher level cache; and scheduling, if the request to access data from the higher level cache is not successful, a subsequent cache write access, wherein the subsequent write cache access prevents concurrent read accesses.

13. The method of claim 12, wherein when determining if the request to access data from the lower level cache is likely to succeed, determining if the request will successfully arbitrate access to a processing unit.

14. The method of claim 12, wherein the multilevel cache system has three cache levels caches or four cache levels.

15. The method of claim 12, wherein when determining whether the request to access data from the lower level cache is redundant of the previous request, determining whether the request and the previous request are seeking the same data.

16. The method of claim 12, wherein the cache write access and the subsequent cache write access prevent concurrent read accesses.

17. The method of claim 12, wherein the lower level cache is a first level cache and the higher level cache is a second level cache.

18. The method of claim 13, wherein the higher level cache is accessed via a translation look aside buffer.

* * * * *